US009566759B2

(12) United States Patent
Perkins et al.

(10) Patent No.: US 9,566,759 B2
(45) Date of Patent: Feb. 14, 2017

(54) DECOMPRESSION PANEL FOR USE IN AN AIRCRAFT ASSEMBLY

(71) Applicant: The Boeing Company, Huntington Beach, CA (US)

(72) Inventors: Thomas Perkins, Renton, WA (US); Jeremy Ryan Glaze Tatum, Federal Way, WA (US); Allan A. Loken, Kent, WA (US); Hannah Rebecca Arm, Renton, WA (US)

(73) Assignee: The Boeing Company, Chicago, IL (US)

( * ) Notice: Subject to any disclaimer, the term of this patent is extended or adjusted under 35 U.S.C. 154(b) by 86 days.

(21) Appl. No.: 14/471,161

(22) Filed: Aug. 28, 2014

(65) Prior Publication Data

US 2015/0115104 A1    Apr. 30, 2015

Related U.S. Application Data

(63) Continuation-in-part of application No. 14/228,576, filed on Mar. 28, 2014, now Pat. No. 9,233,747.

(60) Provisional application No. 61/895,717, filed on Oct. 25, 2013.

(51) Int. Cl.
*B64C 1/00* (2006.01)
*B32B 3/26* (2006.01)
*B64C 1/18* (2006.01)

(52) U.S. Cl.
CPC ............... *B32B 3/266* (2013.01); *B64C 1/18* (2013.01); *B64C 2001/009* (2013.01); *Y10T 29/49622* (2015.01); *Y10T 428/24273* (2015.01)

(58) Field of Classification Search
CPC ...... B64C 2001/009; B64C 1/18; B64D 13/02; B64D 13/04
See application file for complete search history.

(56) References Cited

U.S. PATENT DOCUMENTS

| 1,081,195 A | 12/1913 | Austin |
| 2,395,233 A | 2/1946 | Richardson |
| D153,487 S | 4/1949 | Adam |
| 2,859,841 A | 11/1958 | Reed, Jr. et al. |

(Continued)

FOREIGN PATENT DOCUMENTS

| DE | 114647 C | 3/1899 |
| DE | 1753273 A1 | 3/1971 |

(Continued)

OTHER PUBLICATIONS

International Search Report and Written Opinion of International Application No. PCT/US2014/040844, Feb. 20, 2015, 11 pages.

(Continued)

*Primary Examiner* — Tien Dinh
*Assistant Examiner* — Michael A Fabula
(74) *Attorney, Agent, or Firm* — Armstrong Teasdale LLP

(57) ABSTRACT

A decompression panel for use in an aircraft assembly that includes a body portion including a top edge and a bottom edge, and a front surface and a rear surface opposing the front surface. A plurality of openings are formed in the body portion, and a first stiffening member is formed on the rear surface below the plurality of openings. The first stiffening member extends from the rear surface towards the top edge such that the plurality of openings are at least partially obstructed by the first stiffening member.

20 Claims, 12 Drawing Sheets

(56) References Cited

U.S. PATENT DOCUMENTS

| | | | |
|---|---|---|---|
| 2,925,050 A | 2/1960 | Candlin, Jr. et al. | |
| 3,571,977 A | 3/1971 | Abeel | |
| 4,033,247 A * | 7/1977 | Murphy | B64C 1/18 137/513.3 |
| 4,066,212 A | 1/1978 | Sonneville | |
| 4,133,852 A | 1/1979 | DiNicolantonio et al. | |
| 4,353,503 A | 10/1982 | Duchemin | |
| 4,390,152 A * | 6/1983 | Jorgensen | B64C 1/18 137/513.3 |
| 4,432,514 A * | 2/1984 | Brandon | B64C 1/18 137/513.3 |
| RE32,554 E * | 12/1987 | Murphy | B64C 1/18 244/118.5 |
| 4,819,548 A * | 4/1989 | Horstman | B64D 13/00 244/118.5 |
| 4,899,960 A | 2/1990 | Hararat-Tehrani | |
| 5,046,686 A | 9/1991 | Carla et al. | |
| 5,085,017 A | 2/1992 | Hararat-Tehrani | |
| 5,118,053 A * | 6/1992 | Singh | B64C 1/18 244/118.5 |
| 5,137,231 A * | 8/1992 | Boss | B64C 1/18 244/118.5 |
| D351,903 S | 10/1994 | Whitley, II | |
| D353,193 S | 12/1994 | Porter | |
| D358,205 S | 5/1995 | Ruhland | |
| 5,606,829 A | 3/1997 | Hararat-Tehrani | |
| D390,948 S | 2/1998 | Meyer | |
| D393,708 S | 4/1998 | Assadi | |
| 5,792,230 A | 8/1998 | Moore et al. | |
| D402,356 S | 12/1998 | Hodge | |
| 5,871,178 A | 2/1999 | Barnett et al. | |
| 6,029,933 A * | 2/2000 | Holman | B64C 1/10 244/118.5 |
| 6,129,312 A * | 10/2000 | Weber | B64C 1/18 244/118.5 |
| 6,129,856 A | 10/2000 | Jung et al. | |
| 6,261,042 B1 | 7/2001 | Pratt | |
| 6,264,141 B1 * | 7/2001 | Shim | B64C 1/18 244/118.5 |
| 6,290,445 B1 | 9/2001 | Duran et al. | |
| D456,066 S | 4/2002 | Ching | |
| 6,435,455 B1 * | 8/2002 | Holman | B64C 1/10 244/118.5 |
| D466,605 S | 12/2002 | Ziegler | |
| D469,889 S | 2/2003 | O'Hagin | |
| 6,601,356 B2 | 8/2003 | Snyder | |
| 6,702,230 B2 | 3/2004 | Movsesian et al. | |
| 6,817,941 B1 | 11/2004 | Gatov | |
| D504,172 S | 4/2005 | O'Hagin | |
| D517,193 S | 3/2006 | Calkins | |
| 7,021,855 B2 | 4/2006 | Hardtke et al. | |
| 7,207,524 B2 | 4/2007 | Puschmann et al. | |
| 7,234,894 B1 | 6/2007 | Flury | |
| D576,723 S | 9/2008 | Achen | |
| D578,633 S | 10/2008 | Schluter et al. | |
| D581,487 S | 11/2008 | Wildfang | |
| D582,029 S | 12/2008 | Achen | |
| D589,605 S | 3/2009 | Reedy et al. | |
| D597,653 S | 8/2009 | Calkins | |
| 7,568,659 B2 | 8/2009 | Roques et al. | |
| D606,183 S | 12/2009 | Rosenbohm | |
| D607,989 S | 1/2010 | Llana Garcia | |
| D614,753 S | 4/2010 | DeFelice | |
| D614,754 S | 4/2010 | DeFelice et al. | |
| 7,997,533 B2 | 8/2011 | Muller | |
| 8,201,775 B2 | 6/2012 | Treimer et al. | |
| 8,393,577 B2 | 3/2013 | Roth et al. | |
| 8,397,352 B2 | 3/2013 | Langediers et al. | |
| 8,460,419 B1 | 6/2013 | Hobbs | |
| D693,756 S * | 11/2013 | Stevens | D12/345 |
| 8,651,924 B1 | 2/2014 | Jones et al. | |
| 8,696,418 B1 * | 4/2014 | Griffin | B64D 13/00 454/76 |
| 8,714,483 B2 | 5/2014 | Hoetzeldt et al. | |
| 8,777,537 B2 | 7/2014 | Fritsch | |
| D718,434 S * | 11/2014 | Diamond | D23/388 |
| 8,899,374 B2 | 12/2014 | Tanaka et al. | |
| D723,675 S | 3/2015 | Paskow | |
| D726,093 S * | 4/2015 | Perkins | D12/345 |
| 9,061,566 B2 | 6/2015 | Hoehn | |
| 9,233,747 B2 * | 1/2016 | Perkins | B32B 3/266 |
| 9,249,570 B2 | 2/2016 | Jean | |
| 2003/0168553 A1 | 9/2003 | Diehl et al. | |
| 2003/0222175 A1 | 12/2003 | Movsesian et al. | |
| 2004/0172889 A1 | 9/2004 | Eijkelenberg et al. | |
| 2004/0227311 A1 | 11/2004 | Sanders | |
| 2005/0202692 A1 | 9/2005 | Zeuner et al. | |
| 2006/0240765 A1 | 10/2006 | Cheng | |
| 2009/0008502 A1 | 1/2009 | Lynas | |
| 2009/0179110 A1 | 7/2009 | Leyens | |
| 2010/0058691 A1 | 3/2010 | Mannion | |
| 2010/0096500 A1 | 4/2010 | Benthien | |
| 2010/0101176 A1 | 4/2010 | Metham | |
| 2010/0187358 A1 * | 7/2010 | Voss | B64C 1/18 244/129.4 |
| 2010/0275410 A1 | 11/2010 | Chang | |
| 2010/0320318 A1 * | 12/2010 | Roth | B64C 1/066 244/118.5 |
| 2011/0017742 A1 | 1/2011 | Sausen et al. | |
| 2011/0041293 A1 | 2/2011 | Langediers et al. | |
| 2012/0043421 A1 | 2/2012 | Voss et al. | |
| 2012/0234973 A1 | 9/2012 | Hoetzeldt et al. | |
| 2013/0075525 A1 | 3/2013 | Roth | |
| 2013/0139374 A1 | 6/2013 | Eilken et al. | |
| 2014/0082977 A1 | 3/2014 | Pilon | |
| 2014/0325824 A1 | 11/2014 | Pacini et al. | |
| 2015/0043965 A1 | 2/2015 | Mao-Cheia | |
| 2015/0087217 A1 * | 3/2015 | Switzer | B60H 1/248 454/76 |
| 2015/0115102 A1 * | 4/2015 | Perkins | B32B 3/06 244/119 |
| 2015/0115103 A1 * | 4/2015 | Perkins | B64C 1/18 244/119 |

FOREIGN PATENT DOCUMENTS

| | | |
|---|---|---|
| DE | 20121449 U1 | 9/2002 |
| EP | 0905018 A2 | 3/1999 |
| GB | 2312740 A | 5/1997 |

OTHER PUBLICATIONS

International Search Report and Written Opinion of International Application No. PCT/US2014/038606, Mar. 11, 2015, 13 pages.
International Preliminary Report on Patentablity and Written Opinion for related application PCT/US2014/050645, May 3, 2016; 8 pp.
International Preliminary Report on Patentablity and Written Opinion for related application PCT/US2014/050676, May 6, 2016; 7 pp.
International Preliminary Report on Patentablity and Written Opinion for related application PCT/US2014/038606, Apr. 28, 2016; 9 pp.
International Search Report and Written Opinion issued in International Application No. PCT/US2014/050645, mailed on Nov. 13, 2014.

* cited by examiner

DECOMPRESSION PANEL FOR USE IN AN AIRCRAFT ASSEMBLY

CROSS REFERENCE TO RELATED APPLICATIONS

This application is a continuation-in-part and claims priority to U.S. patent application Ser. No. 14/228,576 filed on Mar. 28, 2014 for "DECOMPRESSION PANEL FOR USE IN AN AIRCRAFT ASSEMBLY", which claims priority to U.S. Provisional Application No. 61/895,717 filed Oct. 25, 2013, which are both hereby incorporated by reference in their entirety.

BACKGROUND

The field of the present disclosure relates generally to aircraft assemblies and, more specifically, to decompression panels for use in aircraft assemblies.

At least some known aircraft include several openings defined between a passenger compartment and adjacent compartments of an aircraft cabin. Such known openings serve a dual purpose. During normal operation, the openings define an air flow path that enables conditioned air to be circulated through the aircraft cabin. During a decompression event, the openings allow large quantities of air to flow therethrough to facilitate equalizing the pressure within the aircraft cabin.

In at least some known aircraft, the openings are covered with a panel including a grille and/or louvers, and a baffle is positioned behind the panel to facilitate reducing noise caused by the air flowing therethrough. The grille and/or louvers are generally designed to allow the passage of air through the openings while restricting the passage of debris and other foreign material therethrough. However, a grille and/or louvers assembly is generally fabricated from materials that facilitate increasing the weight of the aircraft, is difficult to clean, and has a configuration that facilitates limiting the size of noise-reducing baffles that may be installed behind the panel. Moreover, a grille and/or louvers assembly may be aesthetically unpleasant to passengers seated in the aircraft cabin.

BRIEF DESCRIPTION

In one aspect, a decompression panel for use in an aircraft assembly is provided. The decompression panel includes a body portion including a top edge and a bottom edge, and a front surface and a rear surface opposing the front surface. A plurality of openings are formed in the body portion, and a first stiffening member is formed on the rear surface below the plurality of openings. The first stiffening member extends from the rear surface towards the top edge such that the plurality of openings are at least partially obstructed by the first stiffening member.

In another aspect, an aircraft assembly is provided. The aircraft assembly includes a side wall, a floor panel, and a decompression panel coupled between the side wall and the floor panel. The decompression panel includes a body portion including a top edge and a bottom edge, and a front surface and a rear surface opposing the front surface. A plurality of openings are formed in the body portion, and a first stiffening member is formed on the rear surface below the plurality of openings. The first stiffening member extends from the rear surface towards the top edge such that the plurality of openings are at least partially obstructed by the first stiffening member.

In yet another aspect, a method of forming a decompression panel for use in an aircraft assembly is provided. The decompression panel has a body portion including a top edge and a bottom edge, and a front surface and a rear surface opposing the front surface. The method includes forming a plurality of openings in the body portion, and forming a first stiffening member on the rear surface below the plurality of openings. The first stiffening member extends from the rear surface towards the top edge such that the plurality of openings are at least partially obstructed by the first stiffening member.

DETAILED DESCRIPTION

The implementations described herein relate to a decompression panel for use in an aircraft assembly. More specifically, the decompression panel includes a body portion and an array of openings defined in the body portion. The array is configured such that the openings progressively increase in size along a height of the body portion to facilitate increasing the aesthetic appearance of the decompression panel to passengers seated in an aircraft cabin. Moreover, the openings are angled relative to an outer surface of the decompression panel to facilitate obscuring the view of the passengers through the openings, and to facilitate reducing retention of foreign material in the openings.

Moreover, the implementations described herein relate to a decompression panel for use in an aircraft assembly. More specifically, the decompression panel includes a body portion and a plurality of openings defined in the body portion, and a stiffening member below the plurality of openings and extending towards a top edge of the body portion such that the openings are at least partially obstructed. Specifically, the stiffening member is angled relative to an outer surface of the decompression panel to facilitate obscuring the view of the passengers through the openings, and to facilitate reducing retention of foreign material in the openings. Moreover, the decompression panel described herein is more easily manufactured by enabling simplification of the tooling utilized to form the decompression panel.

Figure 1:
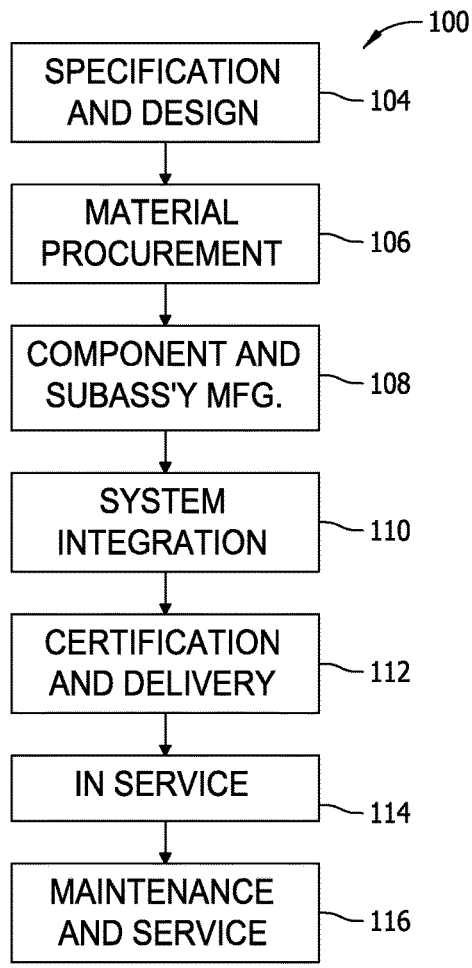
FIG. 1 is a flow diagram of an exemplary aircraft production and service methodology.
Figure 2:
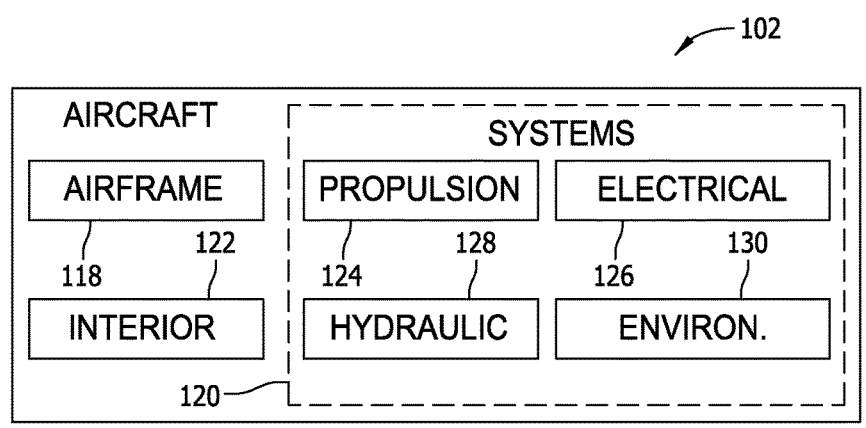
FIG. 2 is a block diagram of an exemplary aircraft.

Referring to the drawings, implementations of the disclosure may be described in the context of an aircraft manufacturing and service method 100 (shown in FIG. 1) and via an aircraft 102 (shown in FIG. 2). During pre-production, including specification and design 104 data of aircraft 102 may be used during the manufacturing process and other materials associated with the airframe may be procured 106. During production, component and subassembly manufacturing 108 and system integration 110 of aircraft 102 occurs, prior to aircraft 102 entering its certification and delivery process 112. Upon successful satisfaction and completion of airframe certification, aircraft 102 may be placed in service 114. While in service by a customer, aircraft 102 is scheduled for periodic, routine, and scheduled maintenance and service 116, including any modification, reconfiguration, and/or refurbishment, for example. In alternative implementations, manufacturing and service method 100 may be implemented via vehicles other than an aircraft.

Each portion and process associated with aircraft manufacturing and/or service 100 may be performed or completed by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, aircraft 102 produced via method 100 may include an airframe 118 having a plurality of systems 120 and an interior 122. Examples of high-level systems 120 include one or more of a propulsion system 124, an electrical system 126, a hydraulic system 128, and/or an environmental system 130. Any number of other systems may be included.

Apparatus and methods embodied herein may be employed during any one or more of the stages of method 100. For example, components or subassemblies corresponding to component production process 108 may be fabricated or manufactured in a manner similar to components or subassemblies produced while aircraft 102 is in service. Also, one or more apparatus implementations, method implementations, or a combination thereof may be utilized during the production stages 108 and 110, for example, by substantially expediting assembly of, and/or reducing the cost of assembly of aircraft 102. Similarly, one or more of apparatus implementations, method implementations, or a combination thereof may be utilized while aircraft 102 is being serviced or maintained, for example, during scheduled maintenance and service 116.

As used herein, the term "aircraft" may include, but is not limited to only including, airplanes, unmanned aerial vehicles (UAVs), gliders, helicopters, and/or any other object that travels through airspace. Further, in an alternative implementation, the aircraft manufacturing and service method described herein may be used in any manufacturing and/or service operation.

Figure 3:
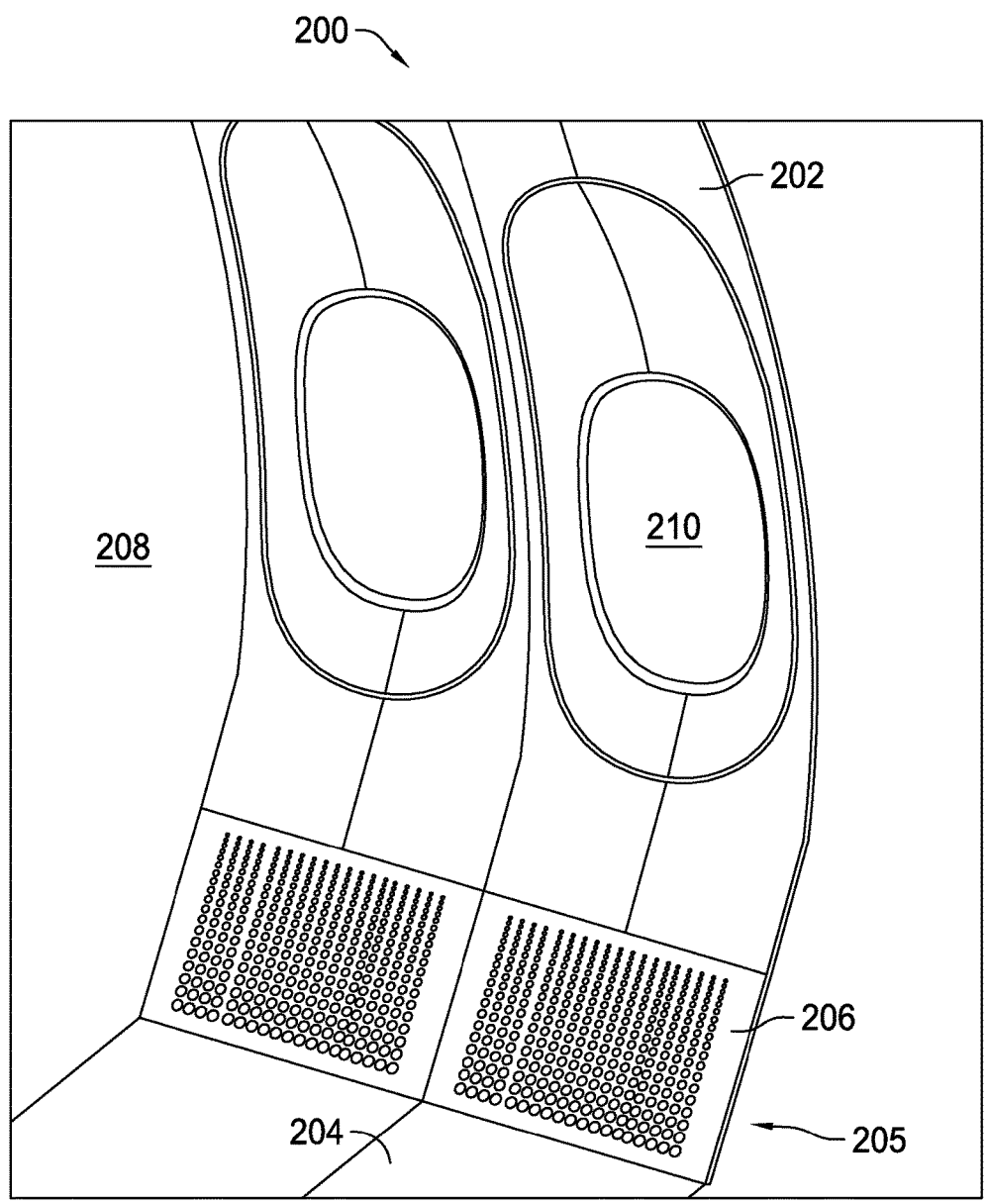
FIG. 3 is a perspective sectional view of an exemplary aircraft cabin.

FIG. 3 is a perspective sectional view of an exemplary aircraft cabin 200 that may be used with aircraft 102 (shown in FIG. 2). In the exemplary implementation, aircraft cabin 200 includes a side wall 202, a floor panel 204, and a decompression panel assembly 205 coupled therebetween that at least partially define an interior 208 of aircraft cabin 200. Side wall 202 also includes a window opening 210 defined therein. In operation, decompression panel assembly 205 facilitates circulating conditioned air through aircraft cabin 200 and/or facilitates equalizing the pressure in aircraft cabin 200 during a decompression event.

Figure 4:
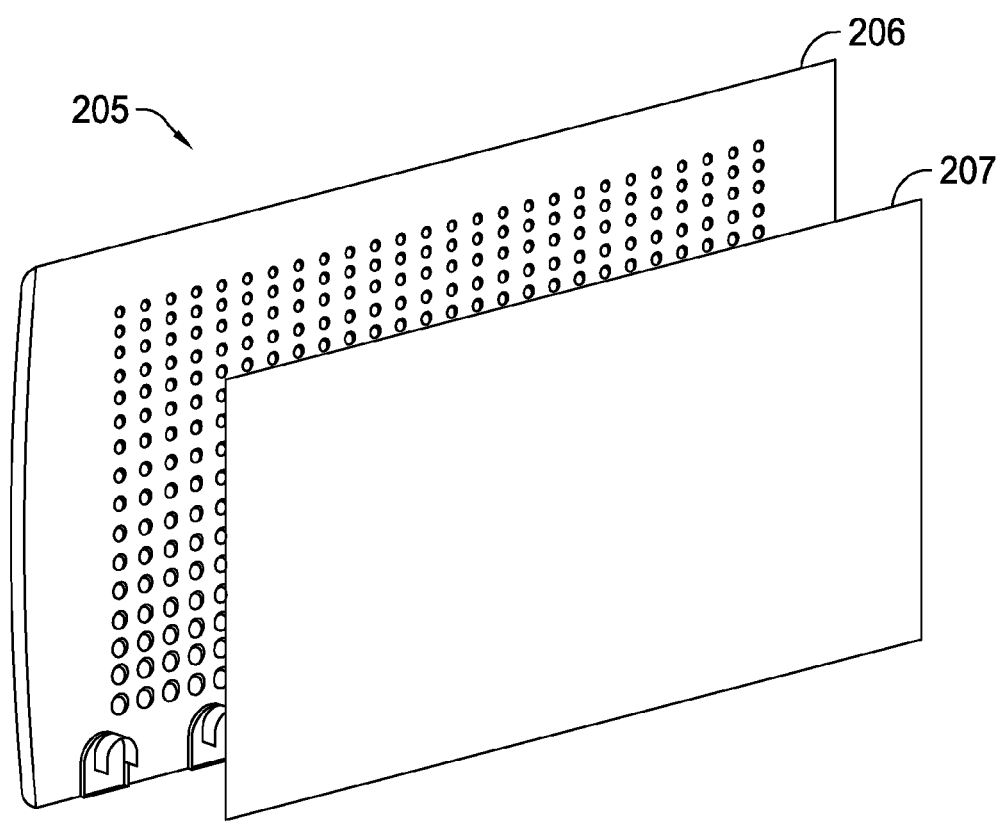
FIG. 4 is a perspective exploded view of an exemplary decompression panel assembly that may be used in the aircraft cabin shown in FIG. 3.
Figure 5:
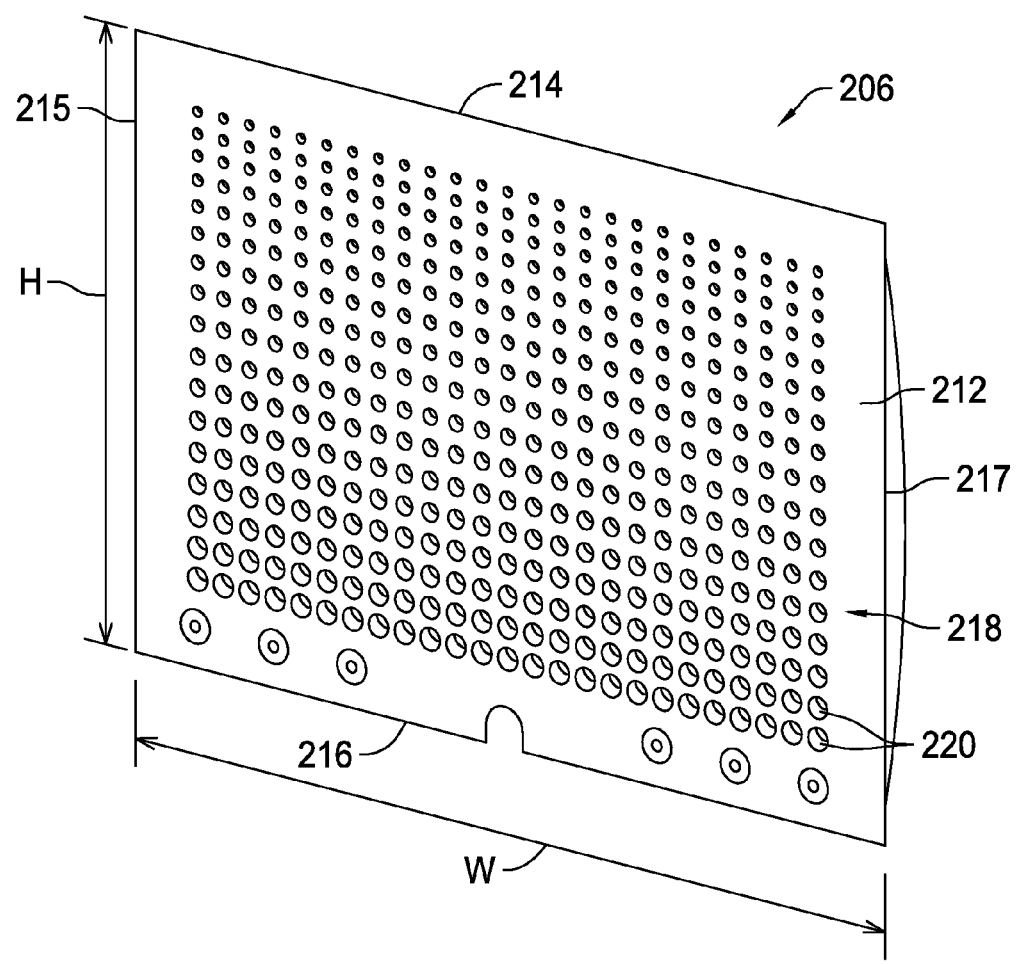
FIG. 5 is a perspective view of an exemplary decompression panel that may be used in the decompression panel assembly shown in FIG. 4.

FIG. 4 is a perspective exploded view of decompression panel assembly 205, and FIG. 5 is a perspective view of decompression panel 206 that may be used in aircraft cabin 200. In the exemplary implementation, decompression panel assembly 205 includes a decompression panel 206 and a baffle 207 to be coupled to decompression panel 206. Baffle 207 facilitates attenuating noise in aircraft cabin 200 during operation. Decompression panel 206 includes a body portion 212 having a top end 214 and a bottom end 216. Decompression panel 206 also includes an array 218 of openings 220 defined in body portion 212 that facilitate channeling air flow (not shown) through decompression panel 206.

Decompression panel 206 may be fabricated from any suitable material. Exemplary materials include, but are not limited to, thermoplastic polymeric materials. As such, decompression panel 206 may be fabricated in a single die, injection molding process.

In the exemplary implementation, openings 220 at top end 214 have a first cross-sectional area and openings at bottom end 216 have a second cross-sectional area that is greater than the first cross-sectional area. More specifically, openings 220 progressively increase in size along a height H of body portion 212 defined between top end 214 and bottom end 216. As such, openings 220 of substantially similar size are substantially aligned across a width W of body portion 212 defined between a first end 215 and a second end 217 of decompression panel 206. Moreover, openings 220 of smaller size are defined at top end 214 such that they are located nearest to passengers (not shown) seated in aircraft cabin 200 (shown in FIG. 3). As such, it will be more difficult for the passengers to access behind decompression panel 206 from interior 208 (shown in FIG. 3) of aircraft cabin 200 through the smaller sized openings 220. Openings 220 of larger size are defined at bottom end 216 to facilitate controlling air flow through decompression panel 206 during non-decompression operation.

Openings 220 have any cross-sectional shape that enables decompression panel 206 to function as described herein. In the exemplary implementation, openings 220 have a substantially elliptical cross-sectional shape and a diameter within a range between about 0.25 inch and about 0.5 inch. As such, openings 220 have a cross-sectional area less than about 0.8 inches squared to facilitate restricting access behind decompression panel 206 from interior 208 of aircraft cabin 200. Array 218 also defines an open surface area in body portion 212 of up to about 75 inches squared.

As described above, decompression panel 206 is coupled between side wall 202 and floor panel 204 (each shown in FIG. 3). In the exemplary implementation, decompression panel 206 is oriented such that top end 214 of body portion 212 is coupled to side wall 202, and bottom end 216 of body portion 212 is coupled to floor panel 204. More specifically, decompression panel 206 is oriented such that the smaller-sized openings 220 are adjacent to side wall 202, and the larger-sized openings 220 are adjacent to floor panel 204. As such, progressively increasing the size of openings 220 from top end 214 to bottom end 216 facilitates improving the aesthetic appearance of decompression panel 206 to passengers (not shown) seated in aircraft cabin 200 (shown in FIG. 3) when viewed from above floor panel 204.

Figure 6:
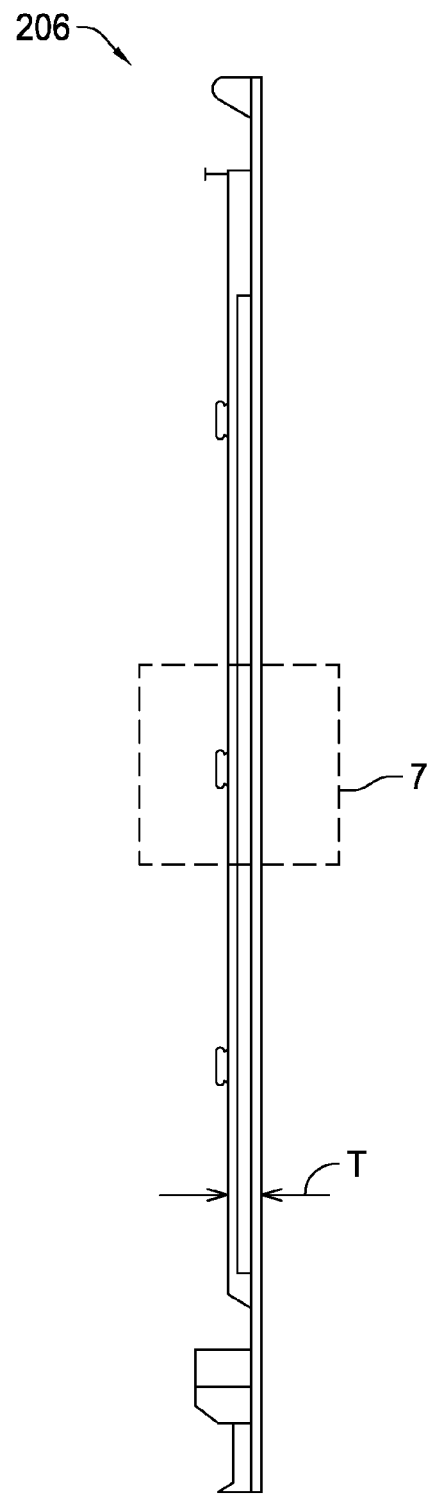
FIG. 6 is a side view of the decompression panel shown in FIG. 5.
Figure 7:
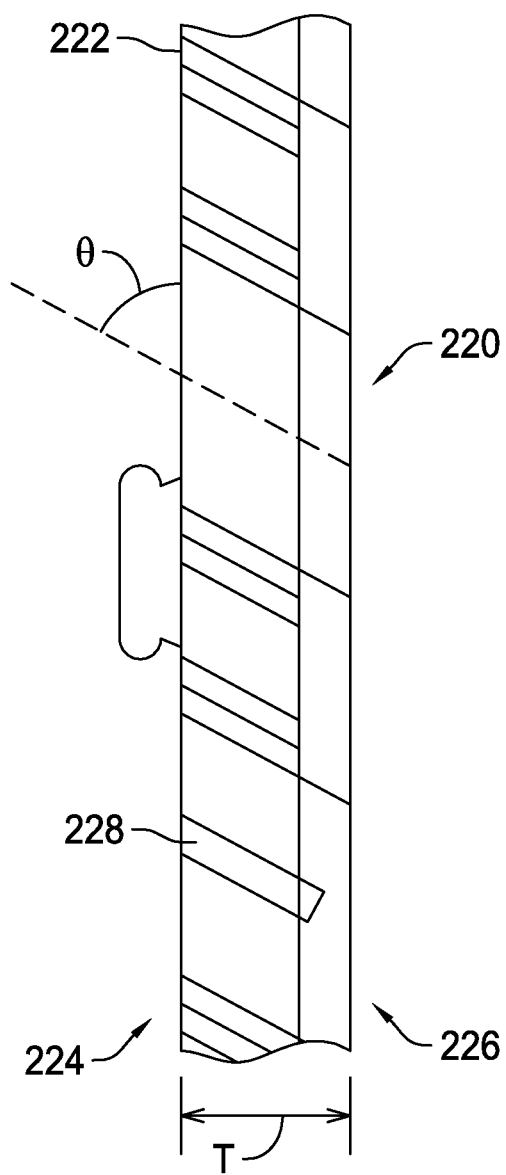
FIG. 7 is an enlarged cross-sectional view of the decompression panel shown in FIG. 6 and taken along Area 7.

FIG. 6 is a side view of decompression panel 206, and FIG. 7 is an enlarged cross-sectional view of decompression panel 206 taken along Area 7. In the exemplary implementation, openings 220 extend through body portion 212 at an oblique angle Θ relative to an outer surface 222 of body portion 212. Openings 220 may be angled at any degree that enables decompression panel 206 to function as described herein. For example, in the exemplary implementation, openings 220 are angled at less than about 90 degrees relative to outer surface 222. Moreover, openings 220 are angled towards floor panel 204 (shown in FIG. 3) as openings 220 extend from a first side 224 of decompression panel 206 towards a second side 226 of decompression panel 206. As such, the line-of-sight of passengers (not shown) seated in aircraft cabin 200 (shown in FIG. 3) through openings 220 is substantially obscured when viewed from above floor panel 204. Moreover, angling openings 220 relative to outer surface 222 facilitates limiting an amount of foreign material retained therein by facilitating gravity drainage of foreign material from openings 220.

Body portion 212 has any thickness T that enables decompression panel 206 to function as described herein. For example, in the exemplary implementation, thickness T is defined within a range between about 0.2 inch and about 0.5 inch. As such, thickness T is less than other known decompression panels to facilitate decreasing an available volume for retention of foreign material within openings 220 and facilitates reducing the weight of decompression panel 206. Moreover, decreasing thickness T enables a thicker baffle 207 (shown in FIG. 4) to be coupled to decompression panel 206 to provide more noise attenuation within cabin 200 during operation. Body portion 212 also includes one or more stiffening members 228 extending from first side 224 of decompression panel 206 and at least partially through at least one opening 220 to facilitate increasing the strength of decompression panel 206 in predetermined localized areas of body portion 212. Stiffening members 228 also extend across body portion 212 and are also substantially aligned with a plurality of openings 220.

A method of forming a decompression panel for use in an aircraft assembly is also provided. The method includes providing a body portion that includes a top end and a bottom end and forming an array of openings in the body portion, wherein openings in the array progressively decrease in size along a height of the body portion from the bottom end towards the top end. Forming the array of openings can include forming the openings to be substantially similarly sized along a width of the body portion from a first end towards a second end of the body portion. Moreover, forming the array of openings can include extending the openings through the body portion at an oblique angle relative to an outer surface of the body portion. In a particular embodiment, forming the array of openings includes forming each opening having a cross-sectional area of less than about 0.8 inches squared. The method further includes forming at least one stiffening member in the body portion, the at least one stiffening member extending from a first side of the body portion and at least partially through at least one of the openings. Forming at least one stiffening member can include extending the at least one stiffening member across the body portion to be substantially aligned with a plurality of the openings.

Figure 8:
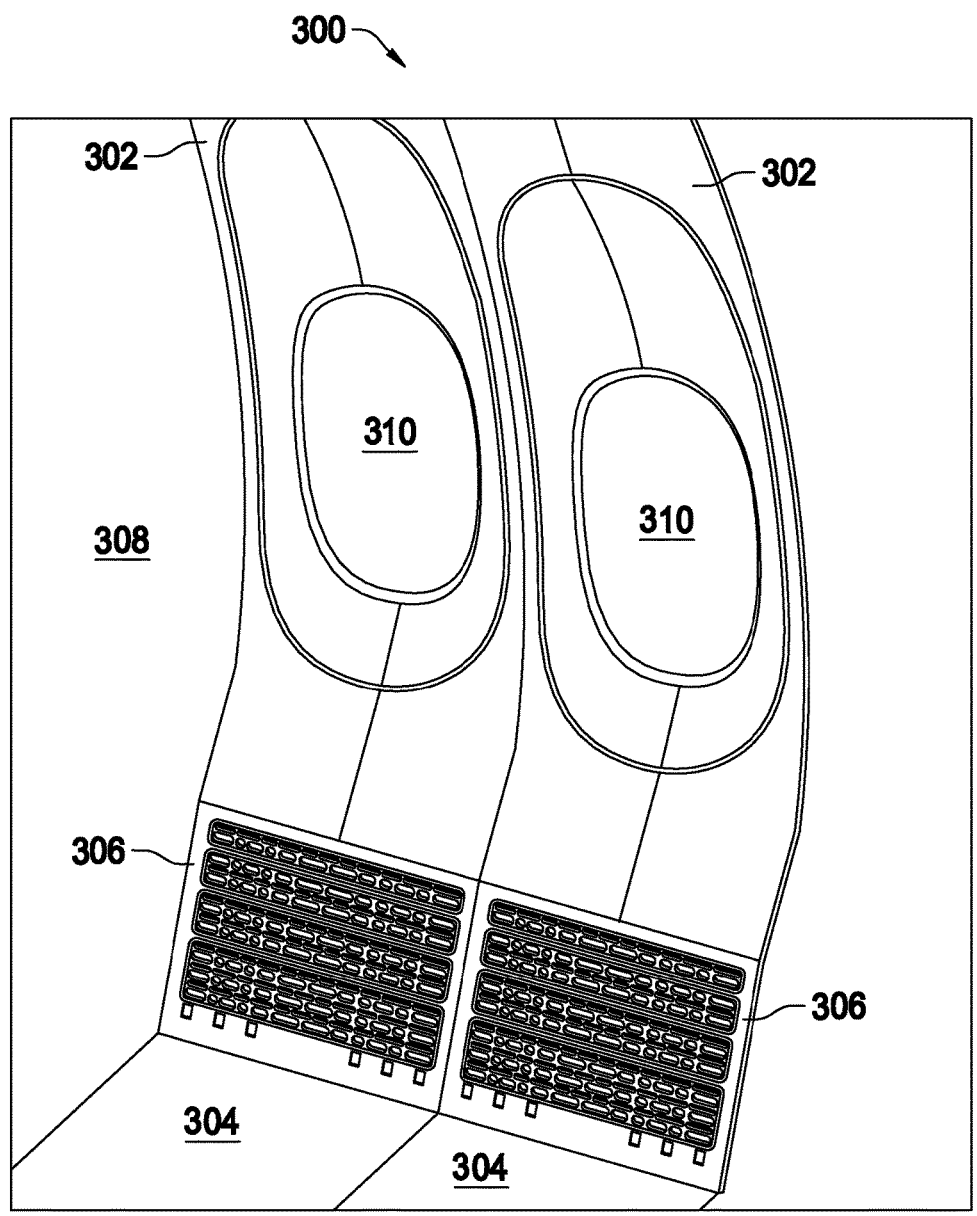
FIG. 8 is a perspective sectional view of an alternative aircraft cabin.

FIG. 8 is a perspective sectional view of an exemplary aircraft cabin 300 that may be used with aircraft 102 (shown in FIG. 2). In the exemplary implementation, aircraft cabin 300 includes a side wall 302, a floor panel 304, and a decompression panel 306 coupled therebetween that at least partially define an interior 308 of aircraft cabin 300. Side wall 302 also includes a window opening 310 defined therein. In operation, decompression panel 306 facilitates circulating conditioned air through aircraft cabin 300 and/or facilitates equalizing the pressure in aircraft cabin 300 during a decompression event.

Figure 9:
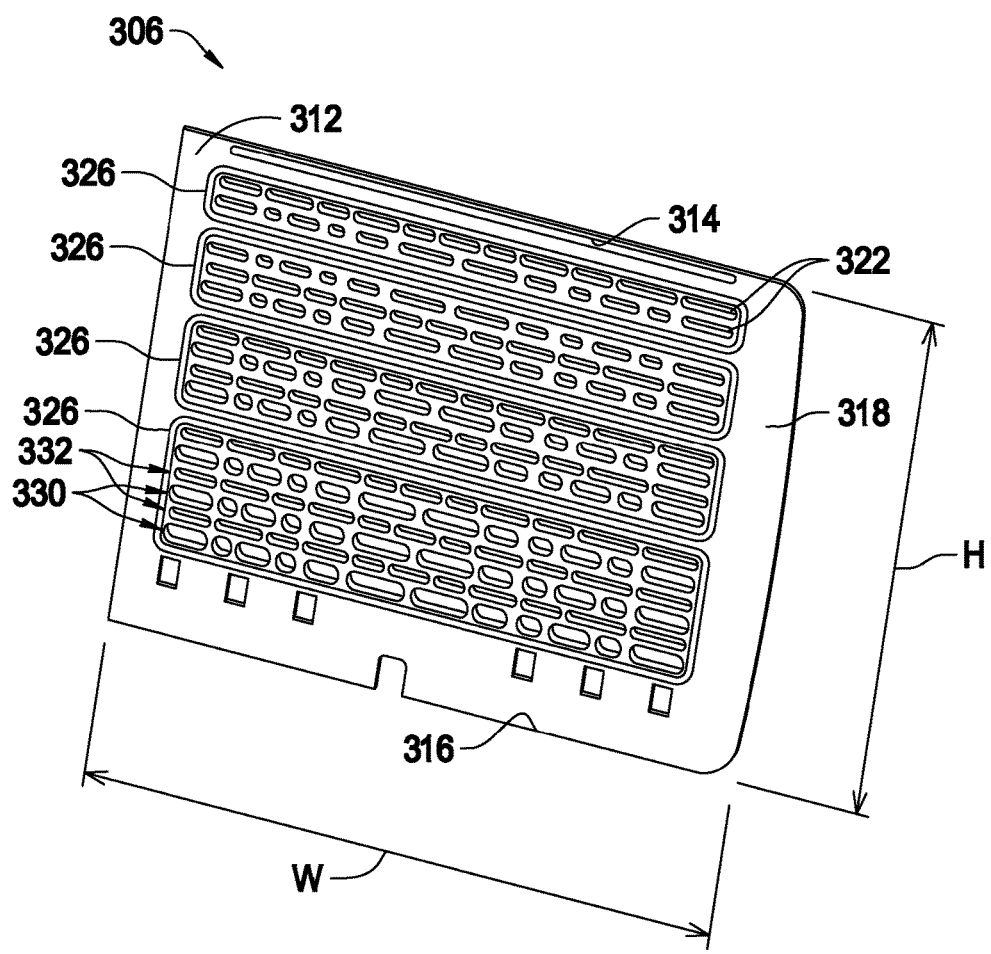
FIG. 9 is a perspective front view of an alternative decompression panel that may be used in the aircraft cabin shown in FIG. 8.
Figure 10:
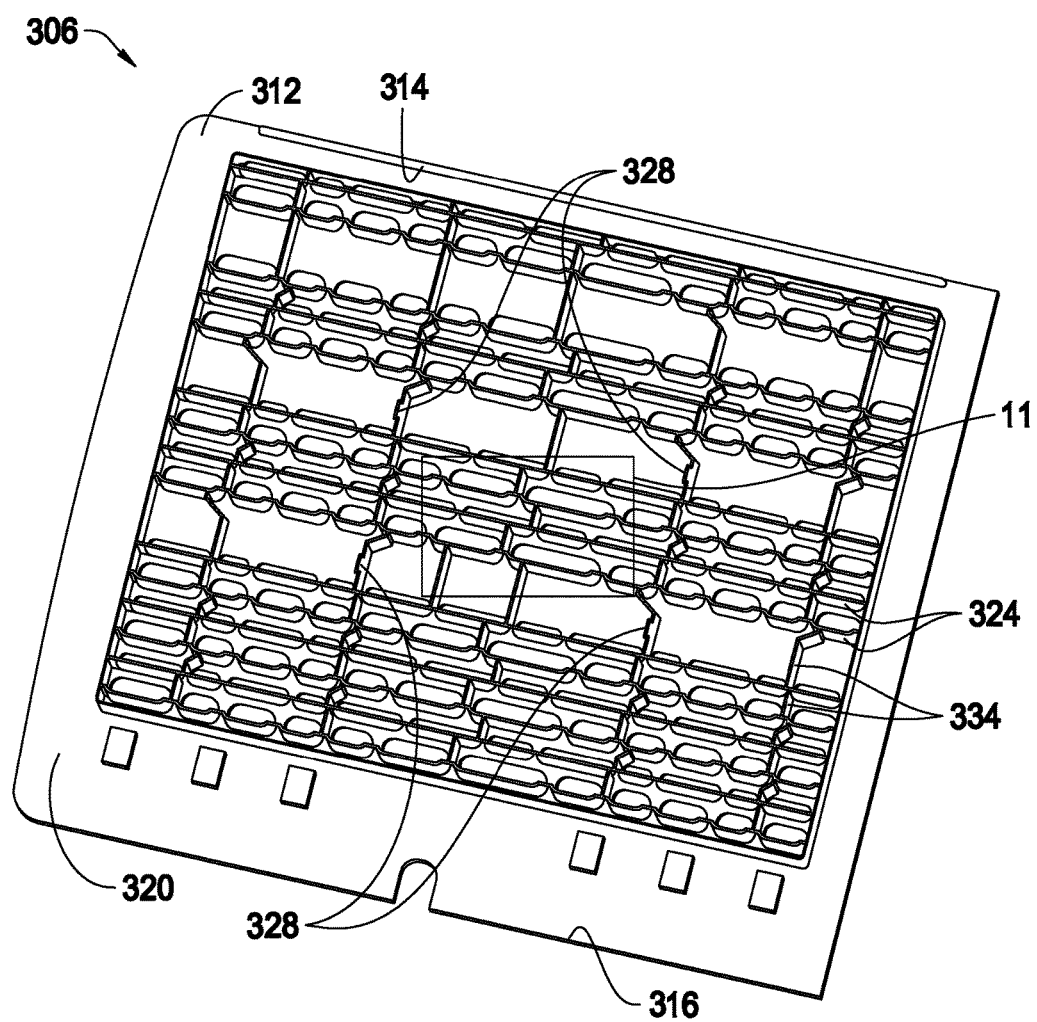
FIG. 10 is a perspective rear view of the decompression panel shown in FIG. 9.

FIG. 9 is a perspective front view of decompression panel 306 that may be used in aircraft cabin 300 (shown in FIG. 8), and FIG. 10 is a perspective rear view of decompression panel 306. In the exemplary implementation, decompression panel 306 includes a body portion 312 including a top edge 314 and a bottom edge 316, and a front surface 318 and a rear surface 320 opposing front surface 318. Decompression panel 306 also includes a plurality of openings 322 formed in body portion 312 that facilitate channeling air flow (not shown) through decompression panel 306. At least one first stiffening member 324 is formed on rear surface 320 below the plurality of openings 322. First stiffening member 324 extends from rear surface 320 towards top edge 314 such that the plurality of openings 322 are at least partially obstructed by first stiffening member 324. More specifically, first stiffening member 324 extends at an angle relative to rear surface 320 such that a view through openings 322 from front surface 318 is at least partially obstructed.

Decompression panel 306 may be fabricated from any suitable material. Exemplary materials include, but are not limited to, thermoplastic polymeric materials. As such, decompression panel 306 may be fabricated in a single die, injection molding process.

In one implementation, the plurality of openings 322 are arranged in rows across a width W of body portion 312. The rows of openings are arranged in groupings 326 of two or more rows, and adjacent groupings 326 are separated from each other by a distance. As such, referring to FIG. 10, the distance provides space for baffle tabs 328 extending from rear surface 320 to be positioned between adjacent groupings 326. Baffle tabs 328 enable a baffle (not shown) to be coupled to decompression panel 306 adjacent to rear surface 320.

Moreover, the average size of holes in the rows of openings 322 varies along a height H of body portion 312. Specifically, in one implementation, a plurality of first rows 330 and a plurality of second rows 332 are in an alternating arrangement along height H of body portion. An average size of openings 322 in first rows 330 progressively decrease in size as the location of the row along height H increases, and an average size of openings 322 in second rows 332 is substantially constant. As such, an average size of openings 322 in a top row positioned adjacent side wall 302 is smaller than an average size of openings 322 in a bottom row positioned adjacent floor panel 304 (shown in FIG. 8). As will be described in more detail below, the size of openings 322 are measured in terms of average area and/or height of openings 322 in respective rows. In an alternative implementation, two first rows 330 or two second rows 332 may be positioned adjacent to each other.

Moreover, the average smaller sized openings 322 are defined at top edge 314 such that they are located nearest to passengers (not shown) seated in aircraft cabin 300 (shown in FIG. 8) such that it will be more difficult for the passengers to access behind decompression panel 306 from interior 308 (shown in FIG. 8) of aircraft cabin 300. The average larger sized openings 322 are defined at bottom edge 316 to facilitate controlling air flow through decompression panel 306 during non-decompression operation. Moreover, progressively decreasing the size of openings 320 from bottom edge 316 to top edge 314 facilitates improving the aesthetic appearance of decompression panel 306 to passengers (not shown) seated in aircraft cabin 300 (shown in FIG. 8) when viewed from above floor panel 304.

As described above, first stiffening member 324 is formed on rear surface 320 below the plurality of openings 322. When openings 322 are arranged in rows, a plurality of first stiffening members 324 are formed on rear surface 320, and one of the plurality of first stiffening members 324 extends along width W of body portion 312 below each row of openings 322 such that each opening 322 in the row is at least partially obstructed. A plurality of second stiffening members 334 are also formed on rear surface 320. Second stiffening members 334 extend substantially vertically between adjacent openings 322 in each row of openings. Second stiffening members 334 facilitate increasing the strength of decompression panel 306 and, when manufacturing decompression panel 306, ensure sufficient mold flow through a die during an injection molding process.

Figure 11:
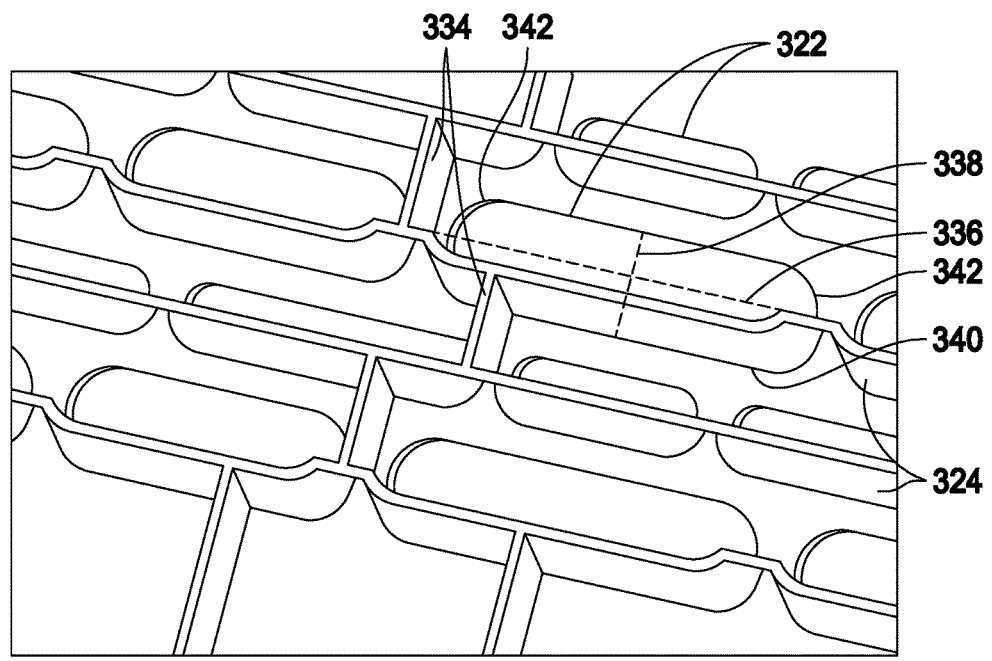
FIG. 11 is an enlarged view of the decompression panel shown in FIG. 10 and taken along Area 11.

FIG. 11 is an enlarged view of the decompression panel shown in FIG. 10 and taken along Area 11. In the exemplary implementation, openings 322 vary in shape along each of the rows. For example, openings 322 have a substantially elongated shape such that each opening 322 in the plurality of openings has a major axis 336 extending along the rows, and a minor axis 338 shorter than major axis 336 defining a height of openings 322. Each opening 322 has a height of less than about 0.5 inch. In an alternative implementation, openings 322 may have any shape that enables decompression panel 306 to function as described herein. For example, openings 322 may have substantially circular, rectangular, or elliptical shapes.

Moreover, as described above, first stiffening members 324 are formed below each row of openings 322. In the exemplary implementation, first stiffening members 324 at least partially circumscribe each opening 322 of the plurality of openings as first stiffening members 324 extend across width W of body portion 312. For example, first stiffening members 324 extend along a bottom portion 340 of each opening 322, and at least partially along the sides 342 of each opening 322 by a height of about half minor axis 338 before extending towards an adjacent opening 322.

Figure 12:
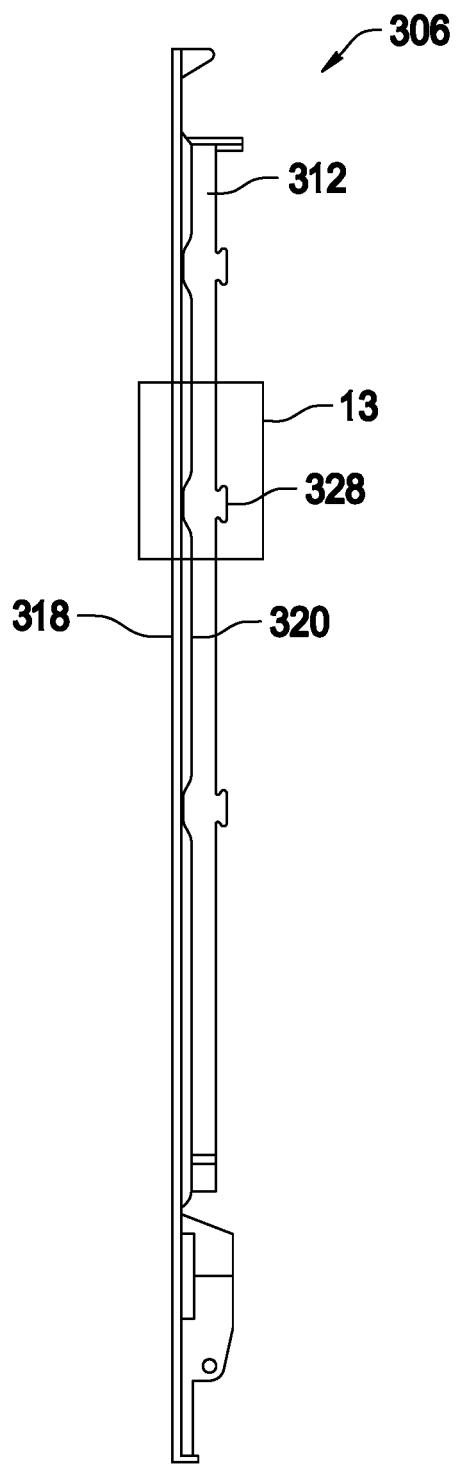
FIG. 12 is a side view of the decompression panel shown in FIG. 9.
Figure 13:
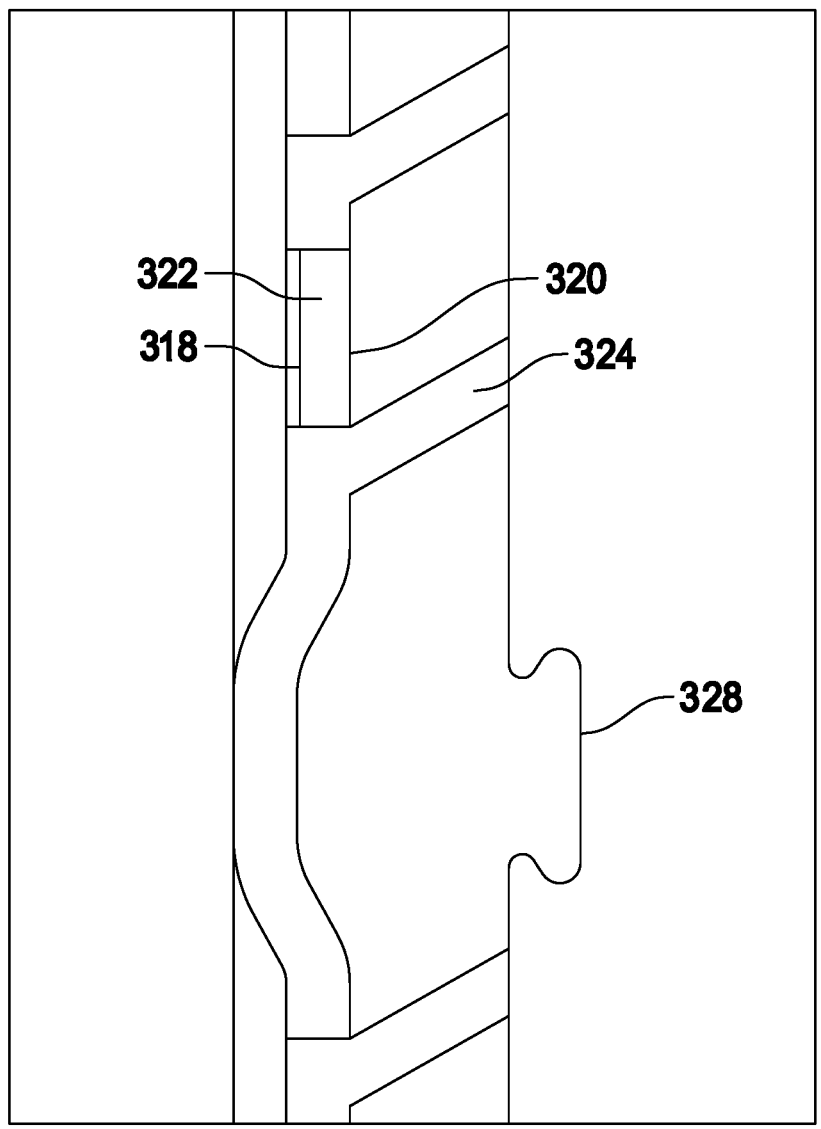
FIG. 13 is an enlarged cross-sectional view of the decompression panel shown in FIG. 12 and taken along Area 13.

FIG. 12 is a side view of decompression panel 306, and FIG. 13 is an enlarged cross-sectional view of decompression panel 306 and taken along Area 13. In the exemplary implementation, openings 322 extend through body portion 312 substantially perpendicularly relative to front and rear surfaces 318 and 320, and first stiffening members 224 may be angled from rear surface 320 at any degree that enables decompression panel 306 to function as described herein. For example, in the exemplary implementation, first stiffening members 324 are angled at less than about 90 degrees relative to rear surface. Moreover, first stiffening members 324 extend towards top edge 314 (shown in FIG. 9) such that the line-of-sight of passengers (not shown) seated in aircraft cabin 300 (shown in FIG. 8) through openings 322 is at least partially obstructed when viewed from above floor panel 304. Moreover, extending first stiffening members 324 towards top edge 314 facilitates limiting an amount of foreign material retained therein by facilitating gravity drainage of foreign material through openings 322.

A method of forming a decompression panel for use in an aircraft assembly is also provided. The method includes providing a body portion including a top edge and a bottom edge, and a front surface and a rear surface opposing said front surface, and forming a plurality of openings in the body portion. The method also includes forming a first stiffening member on the rear surface below the plurality of openings. The first stiffening member extends from the rear surface towards the top edge such that the plurality of openings are at least partially obstructed by the first stiffening member.

Forming the plurality of openings can include arranging the plurality of openings in rows that extend across a width of the body portion, wherein openings in the plurality of openings vary in shape along each of the rows. Moreover, arranging the plurality of openings can include arranging the rows in groupings of two or more rows, wherein adjacent groupings are separated from each other by a distance. Moreover, forming the plurality of openings can include arranging the plurality of openings in a plurality of first rows and a plurality of second rows that each extend along a height of the body portion in an alternating arrangement, wherein an average size of openings in the plurality of first rows progressively decrease in size as a location of each first row increases along the height of the body portion.

Forming a first stiffening member can include at least partially circumscribing each opening in the plurality of openings with the first stiffening member. In a particular implementation, the method also includes extending a second stiffening member substantially vertically between adjacent openings in the plurality of openings.

Decompression panels 206 (shown in FIG. 5) and 306 (shown in FIG. 9) have been described above in detail. It should be understood that features from each of decompression panels 206 and 306 can be combined forming alternative decompression panels.

The decompression panel described herein includes an array/plurality of openings and stiffening members included therein that facilitate at least one of (a) increasing air flow through the decompression panel over other known decompression panels; (b) improving an aesthetic appearance of the decompression panel; (c) restricting access to behind the decompression panel through the openings; and (d) limiting retention of foreign material in the openings. Moreover, the configuration of the decompression panel results in reduced material usage and weight when compared to other known decompression panels while simultaneously retaining its impact resistance. As such, reducing the overall weight of the decompression panel enables a larger baffle to be implemented behind the decompression panel to facilitate a larger pressure equalization airflow.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A decompression panel for use in an aircraft assembly, said decompression panel comprising:
   a body portion comprising a top edge and a bottom edge, and a front surface and a rear surface opposing said front surface;
   a plurality of openings formed in said body portion and extending between said front surface and said rear surface; and at least one first stiffening member formed on said rear surface below said plurality of openings, said at least one first stiffening member extending along a width of said body portion and at least partially circumscribing at least one opening in said plurality of openings, said at least one first stiffening member further extending from said rear surface towards said top edge such that said plurality of openings are at least partially obstructed by said first stiffening member.

2. The decompression panel in accordance with claim 1, wherein said plurality of openings are arranged in rows that extend across the width of said body portion, wherein openings in said plurality of openings vary in shape along each of said rows.

3. The decompression panel in accordance with claim 2, wherein said rows of openings are arranged in at least two groupings that each include two or more rows, wherein adjacent groupings are separated from each other by a distance.

4. The decompression panel in accordance with claim 3 further comprising a baffle tab extending from said rear surface and positioned between said adjacent groupings of rows.

5. The decompression panel in accordance with claim 2, wherein said at least one first stiffening member comprises a plurality of first stiffening members formed on said rear surface, wherein one of said plurality of first stiffening members extends along the width of said body portion below each row of openings.

6. The decompression panel in accordance with claim 1, wherein said at least one first stiffening member at least partially circumscribes each opening in said plurality of openings.

7. The decompression panel in accordance with claim 1 further comprising a plurality of second stiffening members that extend substantially vertically between adjacent openings of said plurality of openings.

8. The decompression panel in accordance with claim 1, wherein each opening in said plurality of openings has a height of less than about 0.5 inch.

9. An aircraft assembly comprising:
a side wall;
a floor panel; and
a decompression panel coupled between said side wall and said floor panel, said decompression panel comprising:
a body portion comprising a top edge and a bottom edge, and a front surface and a rear surface opposing said front surface;
a plurality of openings formed in said body portion and extending between said front surface and said rear surface; and
at least one first stiffening member formed on said rear surface below said plurality of openings, said at least one first stiffening member extending along a width of said body portion and at least partially circumscribing at least one opening in said plurality of openings, said at least one first stiffening member further extending from said rear surface towards said top edge such that said plurality of openings are at least partially obstructed by said first stiffening member.

10. The assembly in accordance with claim 9, wherein said plurality of openings are arranged in a plurality of first rows and a plurality of second rows that each extend along a height of said body portion in an alternating arrangement, wherein an average size of openings in said plurality of first rows progressively decrease in size as a location of each first row increases along the height of said body portion.

11. The assembly in accordance with claim 10, wherein an average size of openings in said plurality of second rows is substantially constant.

12. The assembly in accordance with claim 9, wherein said plurality of openings are arranged in rows that extend across the width of said body portion, wherein openings in said plurality of openings vary in shape along each of said rows.

13. The assembly in accordance with claim 12, wherein said at least one first stiffening member comprises a plurality of first stiffening members formed with said rear surface, wherein one of said plurality of first stiffening members extends along the width of said body portion below each row of openings.

14. The assembly in accordance with claim 9 further comprising a plurality of second stiffening members that extend substantially vertically between adjacent openings of said plurality of openings.

15. A method of forming a decompression panel for use in an aircraft assembly, the decompression panel having a body portion including a top edge and a bottom edge, and a front surface and a rear surface opposing the front surface, said method comprising:
forming a plurality of openings in the body portion, the plurality of openings extending between the front surface and the rear surface; and
forming a first stiffening member on the rear surface below the plurality of openings, the first stiffening member extending along a width of the body portion and at least partially circumscribing at least one opening in the plurality of openings, the first stiffening member further extending from the rear surface towards the top edge such that the plurality of openings are at least partially obstructed by the first stiffening member.

16. The method in accordance with claim 15, wherein forming a plurality of openings comprises arranging the plurality of openings in rows that extend across the width of the body portion, wherein openings in the plurality of openings vary in shape along each of the rows.

17. The method in accordance with claim 16, wherein arranging the plurality of openings in rows comprises arranging the rows in at least two groupings that each include two or more rows, wherein adjacent groupings are separated from each other by a distance.

18. The method in accordance with claim 15, wherein forming a plurality of openings comprises arranging the plurality of openings in a plurality of first rows and a plurality of second rows that each extend along a height of the body portion in an alternating arrangement, wherein an average size of openings in the plurality of first rows progressively decrease in size as a location of each first row increases along the height of the body portion.

19. The method in accordance with claim 15, wherein forming a first stiffening member comprises at least partially circumscribing each opening in the plurality of openings with the first stiffening member.

20. The method in accordance with claim 15 further comprising extending a second stiffening member substantially vertically between adjacent openings in the plurality of openings.

* * * * *